(12) United States Patent
Pilzweger et al.

(10) Patent No.: US 10,683,009 B2
(45) Date of Patent: Jun. 16, 2020

(54) METHOD FOR OPERATING A DRIVE TRAIN OF A MOTOR VEHICLE IN AN INCLINED POSITION

(71) Applicant: ZF Friedrichshafen AG, Friedrichshafen (DE)

(72) Inventors: Hans Pilzweger, Neuhaus am Inn (DE); Alexander Stöbich, Wegscheid (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/185,312

(22) Filed: Nov. 9, 2018

(65) Prior Publication Data

US 2019/0143980 A1    May 16, 2019

(30) Foreign Application Priority Data

Nov. 10, 2017  (DE) .................. 10 2017 220 099

(51) Int. Cl.
*B60W 10/04*    (2006.01)
*B60W 30/18*    (2012.01)
(Continued)

(52) U.S. Cl.
CPC ...... *B60W 30/18109* (2013.01); *B60W 10/02* (2013.01); *B60W 10/04* (2013.01);
(Continued)

(58) Field of Classification Search
CPC ......... B60W 30/18109; B60W 10/184; B60W 50/087; B60W 30/18018; B60W 10/02;
(Continued)

(56) References Cited

U.S. PATENT DOCUMENTS 6,135,920 A   10/2000 Kamiya et al.
6,454,677 B2   9/2002 Saito et al.
(Continued)

FOREIGN PATENT DOCUMENTS

DE   199 27 975 A1   12/1999
DE   601 18 830 T2    9/2006
(Continued)

OTHER PUBLICATIONS

German Search Report Corresponding to 10 2017 220 099.5 dated Feb. 14, 2018.

*Primary Examiner* — David J Hlavka
(74) *Attorney, Agent, or Firm* — Davis & Bujold PLLC; Michael J. Bujold

(57) ABSTRACT

A method for operating a drive train of a motor vehicle in an inclined position, in particular an agricultural or municipal utility vehicle. A connection between a prime mover and at least one drive axle of the motor vehicle is automatically disconnected as part of a function upon actuation of a service brake for stopping the motor vehicle monitored by at least one sensor. To avoid uncontrolled backward rolling, provision is made that a maximum brake pressure applied to achieve or maintain the standstill of the motor vehicle is determined and monitored by continually measuring a brake pressure applied by the service brake. Upon the brake pressure falling below the maximum brake pressure minus a pre-definable pressure difference, the function is automatically deactivated and thus the connection is automatically re-established between the prime mover and the at least one drive axle.

11 Claims, 4 Drawing Sheets

(51) Int. Cl.
*B60W 10/02* (2006.01)
*B60W 50/08* (2020.01)
*B60W 10/184* (2012.01)
*B60W 10/196* (2012.01)

(52) U.S. Cl.
CPC ........ *B60W 10/184* (2013.01); *B60W 10/196* (2013.01); *B60W 30/18018* (2013.01); *B60W 30/1819* (2013.01); *B60W 30/18118* (2013.01); *B60W 50/087* (2013.01); *B60W 2300/15* (2013.01); *B60W 2510/182* (2013.01); *B60W 2540/12* (2013.01); *B60Y 2200/22* (2013.01); *F16D 2500/10412* (2013.01); *F16D 2500/31413* (2013.01); *F16D 2500/31426* (2013.01)

(58) Field of Classification Search
CPC ........... B60W 10/04; B60W 30/18118; B60W 30/1819; B60W 10/196; B60W 2300/15; B60W 2540/13; B60W 2510/182; F16D 2500/31426; F16D 2500/31413; F16D 2500/10412; B60Y 2200/22
See application file for complete search history.

(56) References Cited

U.S. PATENT DOCUMENTS

| 2011/0065548 | A1* | 3/2011 | Yu ......................... | B60W 10/06 477/203 |
| 2016/0297415 | A1* | 10/2016 | Kato ................ | B60W 30/18118 |
| 2016/0304096 | A1* | 10/2016 | Khafagy .......... | B60W 30/18109 |
| 2016/0332627 | A1* | 11/2016 | Yoon .................... | B60W 30/186 |
| 2017/0043767 | A1* | 2/2017 | Khafagy ............... | B60W 10/06 |
| 2017/0320499 | A1* | 11/2017 | Bednarek ................ | B60T 1/062 |

FOREIGN PATENT DOCUMENTS

| DE | 10 2009 012 847 A1 | 9/2010 |
| DE | 10 2014 205 176 A1 | 3/2015 |
| DE | 10 2015 203 453 A1 | 9/2016 |

\* cited by examiner

METHOD FOR OPERATING A DRIVE TRAIN OF A MOTOR VEHICLE IN AN INCLINED POSITION

This application claims priority from German patent application serial no. 10 2017 220 099.5 filed Nov. 10, 2017.

FIELD OF THE INVENTION

The invention relates to a method for operating a drive train of a motor vehicle in an inclined position, in particular an agricultural or municipal utility vehicle, wherein a connection between a prime mover and at least one drive axle of the motor vehicle is disconnected upon actuation of a service brake for stopping the motor vehicle monitored by at least one sensor as part of a function. Furthermore, the invention relates to a control unit for a drive train of a motor vehicle, a computer program product and a data storage medium, on which this computer program product is stored.

BACKGROUND OF THE INVENTION

In motor vehicles having automated manual transmissions or automatic transmissions, even if the accelerator is not actuated by the driver, drive is transmitted from a prime mover of the motor vehicle to the drive axle(s) of the motor vehicle, which then results in a forward motion even though the accelerator is not actuated. To make the motor vehicle stop, the driver must actively operate the relevant service brake, which results in the prime mover working against the service brake and thus higher fuel consumption.

To prevent increased fuel consumption, it is known in motor vehicles to selectively disconnect a connection between the prime mover and the drive axle(s) of the motor vehicle as part of that function and thus deliberately suppress the forward movement of the motor vehicle. The activation and deactivation of the function occurs depending on the actuation of the service brake. A sensor detects the actuation or release of the service brake by means of an adjustment travel of an operating element of the service brake. Upon actuation of the service brake, the sensor responds after a short adjustment travel of the actuating element to signal a braking process at an early stage. Releasing the service brake thus does not lead immediately to the deactivation of the function, such that the motor vehicle that is in an inclined position can be set in forward or backward motion, depending on the slope.

From DE 601 18 830 T2 a method is known in which a connection between a prime mover of a motor vehicle and a drive axle of the motor vehicle is disconnected as part of a function. The function is activated if the motor vehicle is stationary and actuation of the service brake is detected by a sensor. An additional slope sensor detects whether the motor vehicle is in an inclined position at that time. Depending on the slope and the selected direction of travel, the function is activated or deactivated. In the presence of a slope exceeding a certain value, the function is not activated, that is, the drive train of the motor vehicle is not placed in a neutral state, in which the prime mover and the drive axle are disconnected from each other, although the motor vehicle is held in a stationary state by the actuated service brake.

SUMMARY OF THE INVENTION

Based on the prior art described above, the present invention addresses the problem of providing a method for operating a drive train of a vehicle in an inclined position in the course of which a connection between a prime mover and at least one drive axle of the motor vehicle can be automatically disconnected, wherein uncontrolled movement of the motor vehicle due to the disconnection of the connection is avoided.

From a process-engineering point of view and from a device point of view, the objects are solved by the features of the independent claims. The subsequent dependent claims each describe advantageous developments of the invention. Furthermore, a computer program product and a data storage medium on which the former is stored are also the subject matter of the claims.

According to the invention, in a method for operating a drive train of a motor vehicle in an inclined position, a connection between a prime mover and at least one drive axle of the motor vehicle is automatically disconnected as part of a function upon actuation of a service brake for stopping the motor vehicle monitored by at least one sensor. An inclined position of the motor vehicle is present if it is on a downward or upward slope.

As part of the function, the transmission of drive movement from the prime mover to the at least one drive axle of the motor vehicle is interrupted, in which case the connection to one or more drive axles of the motor vehicle is interrupted, depending on the number of drive axles of the motor vehicle. This also includes trailed axles of the vehicle, which can be added to the drive train by a connection device. In this respect, the function is used to prevent the forward crawl of the motor vehicle, wherein the actuation of the service brake by the driver is a necessary condition for the automatic triggering of the function.

In the context of the invention, the prime mover is in particular an internal combustion engine, which can be connected to the relevant drive axle within the drive train via an intermediate starting element, a motor vehicle transmission, and the relevant axle gearing of the relevant drive axle. The motor vehicle is preferably a municipal or agricultural utility vehicle, in particular a farm tractor.

The invention now comprises the technical teaching that a maximum brake pressure applied to achieve or maintain the standstill of the motor vehicle is determined and monitored by continually measuring the brake pressure applied by the service brake, wherein upon the brake pressure falling below the maximum brake pressure minus a pre-definable pressure difference, the function is automatically deactivated and thus the connection between the prime mover and the at least one drive axle is automatically re-established. This is the case if the motor vehicle is positioned on an incline and the braking force applied by the service brake being released is insufficient to hold the position of the motor vehicle, and an uncontrolled rolling motion of the motor vehicle can occur. A time delay between the release of the service brake and the deactivation of the function due to the detection of the incipient release of the service brake to initiate the starting process is thus compensated.

As compared to the state that provided for the activation of the function for disconnecting the connection between the prime mover and the at least one drive axle, as soon as it is determined that the brake pressure falls below the maximum braking force that was applied for achieving or maintaining [the standstill] by the service brake, minus the predetermined pressure difference, this function is deactivated again and the connection between the prime mover and the at least one drive axle of the motor vehicle is re-established, although a complete termination of the operation of the service brake has not yet been detected.

Such an embodiment of a method for operating a drive train of the vehicle in the inclined position has the advantage that the intention of releasing the brake and driving off is detected at an early stage, such that by the deactivation of the function uncontrolled movement contrary to the desired direction of travel is avoided by initiating the process of driving off. The dynamics of the driving-off process when using the stop/idle function controlled by the actuation of the service brake, in particular a brake pedal, is improved.

Compared to the prior art, the method according to the invention uses the function of automatic disconnection even if the motor vehicle is on a slope, thereby preserving the potential for saving fuel. In addition, driving off in motor vehicles, in particular in those having an automated synchronous or partial power shift transmissions, can be made more comfortable and safer.

Within a motor vehicle drive train, the method according to the invention is preferably controlled by a control unit, which in particular is the control unit of a starting element arranged in the drive train. In this case, the control unit comprises a device for regulating a function for operating the drive train of the vehicle in an inclined position, wherein the device disconnects a connection between a prime mover and at least one drive axle of the motor vehicle upon actuation of a service brake for stopping the motor vehicle monitored by at least one sensor, as part of that function. Furthermore, the device for determining a maximum braking pressure applied to achieve or maintain the standstill of the vehicle and for monitoring the application of the maximum brake pressure is established by a continuous measurement of a brake pressure applied by the service brake. The device is configured to automatically deactivate the function when the maximum brake pressure falls below a pre-definable pressure difference and thus to automatically re-establish the connection between the prime mover and the at least one drive axle.

According to one embodiment of the invention, the actuation of the service brake is detected by a sensor arranged in the brake circuit of the service brake. A pressure sensor arranged in the brake circuit of the pneumatically or hydraulically operable service brake can serve to determine the currently existing brake pressure. The detection of a brake pressure can be used to activate the function for disconnecting the connection between the prime mover and the at least one drive axle.

According to one embodiment of the invention, the actuation of the service brake can be detected by monitoring a switching state of at least one sensor designed as a brake light switch. In the context of the invention, the operation of the service brake is monitored in particular by observing the relevant switching state of the brake light switch(es). If the motor vehicle is an agricultural or municipal commercial vehicle, in which wheel brakes of the left side and the right side can be actuated independently of each other in order to increase the maneuverability of the commercial vehicle, then the service brake for activating the function is only considered actuated if the wheel brakes for both sides are pressed. When observing the brake light switch in this case, the brake light switches for both sides of the vehicle must be turned on.

Preferably, the pressure difference amount can be adapted to the individually determined maximum brake pressure. This permits a reaction to different operating situations, which may influence the magnitude of the maximum brake pressure applied by the service brake. The maximum brake pressure required to stop and hold a motor vehicle on level surfaces is different from that required on a slope. Furthermore, the maximum required brake pressure is affected by a trailer or an attachment attached to the motor vehicle. Accordingly, the respective pressure difference can be adjusted in relation thereto in order to counteract an unwanted deactivation of the function.

For the purposes of the invention, values for the pressure difference amount are present as parameterizable values, i.e. they have been stored previously. For this purpose, at least one characteristic can be stored in the control unit. If multiple characteristics are stored, the possibility of selection by an operator or an automatic selection dependent on the mode of operation of the motor vehicle, i.e. for instance, towing a trailer or the like, may be provided.

Furthermore, selection of the pressure difference can be based on an allocation to different maximum brake pressures determined by the sensor, stored in at least one table. In the table, various values for a maximum brake pressure are each allocated to a specific pressure difference. The table can be freely parameterizable depending on the vehicle type and the operating mode. The table provides a static allocation of a brake pressure range to a specific pressure difference. The allocation can be roughly or finely graded based on the size of the brake pressure range.

In a further development of the invention, the disconnection and also a re-establishment of the connection between the prime mover and the at least one drive axle of the motor vehicle is effected by a starting element located between the prime mover and a motor vehicle transmission. Further preferably, the starting element is then a clutch, which can be used to interrupt the mechanical connection between the prime mover and motor vehicle transmission in the open state. The clutch can be a dry or wet friction clutch. Alternatively, it is also conceivable to conduct the disconnection of the connection between the prime mover and drive axle at a different place on the drive train, for example, by selective actuation of the switching device of the transmission from an engaged gear to a neutral position.

The solution according to the invention can also be embodied as a computer program product which, when running on a processor of a control unit, instructs the processor via software to carry out the associated process steps according to the invention. In this context, a computer-readable medium, on which a computer program product described above is retrievably stored, is part of the subject matter of the invention.

The invention is not limited to the specified combination of the features of the independent or the dependent claims. There are also options to combine individual features, even if they arise from the claims, from the following description of preferred embodiments of the invention or directly from the drawings. Any references in the claims to the drawings by use of reference numerals is not intended to limit the scope of the claims.

BRIEF DESCRIPTION OF THE DRAWINGS

Advantageous embodiments of the invention, which are explained below, are shown in the drawings. In the drawings.

DETAILED DESCRIPTION OF THE PREFERRED EMBODIMENTS

Figure 1:
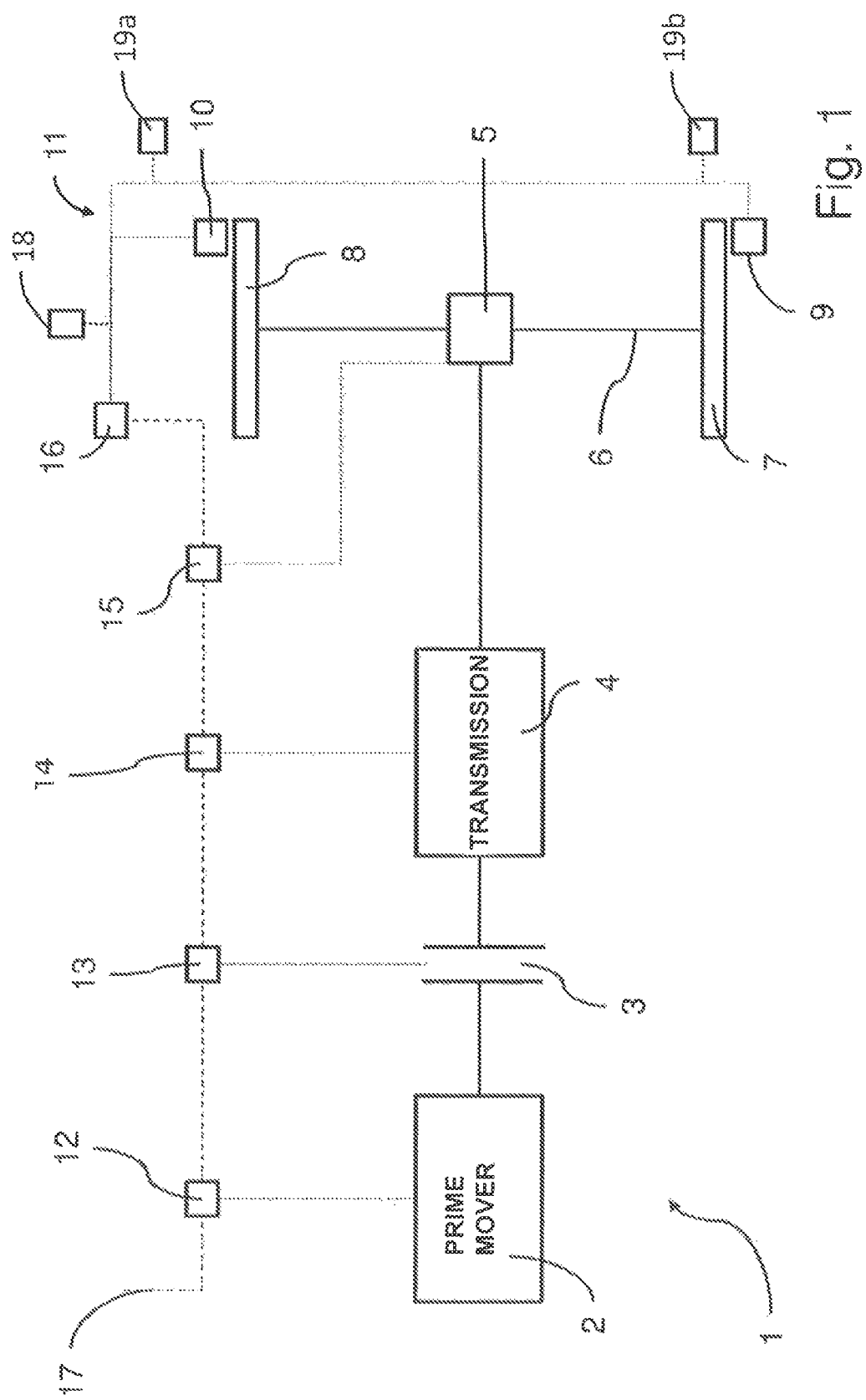
FIG. 1 shows a schematic view of a drive train of a motor vehicle.

FIG. 1 shows a schematic view of a drive train 1 of a motor vehicle, which is preferably an agricultural or municipal commercial vehicle and more preferably a farm tractor. The drive train 1 comprises a prime mover 2, which is designed as an internal combustion engine and can be connected to a motor vehicle transmission 4 downstream at its output side via an intermediate starting element 3. While the starting element 3 is preferably in the form of a dry or wet friction clutch, the motor vehicle transmission 4 is, in particular, a manual transmission.

As can be further seen in FIG. 1, the output side of the motor vehicle transmission 4 is connected to an axle transmission 5 of a drive axle 6, wherein the axle transmission 5 is used to allocate a translated drive motion of the prime mover 2 to two drive wheels 7 and 8 arranged on the drive axle 6 via the motor vehicle transmission 4. A wheel brake 9 and 10 of a service brake 11 of the motor vehicle is allocated to the respective the drive wheels 7 and 8, at the actuation of which the relevant drive wheel 7 and 8 is braked. The drive wheels 7 and 8 can also be braked independently of each other to increase maneuverability of the motor vehicle. The actuation or release of the service brake 11 results in an actuation of brake light switches 19 $a$, 19$b$ associated with the brake pedal mechanism. The actuation states of the two wheel brakes 9 and 10 can be checked on the basis of actuation states $S_{R,Brems}$ and $S_{L,Brems}$ of the relevant brake light switch 19$a$, 19$b$.

The prime mover 2, the starting element 3, the motor vehicle transmission 4, the axle transmission 5 and also the service brake 11 are each assigned a respective control unit 12 or 13 or 14 or 15 or 16, which are integrated with further control units—not shown here—in a data bus system 17 of the motor vehicle and which communicate with each other. In this case, the control unit 12 controls the prime mover 2; while an automated opening and closing of the starting element 3 can be controlled by means of the control unit 13. In addition to this automated operation of the starting element 3, there is also the option of manually opening and closing the starting element 3 according to the specifications of the driver of the vehicle, for which purpose the control unit 13 is in communication with a clutch pedal—not shown here.

The control unit 14 is associated with the motor vehicle transmission 4 and can regulate it in the manner of an automated manual transmission, wherein there is also the option of performing operations according to the specifications of the driver in a manual shifting mode. Finally, the control unit 15 is assigned to the axle transmission 5 on the drive axle 6 and the control unit 16 is assigned to the service brake 11 and to a pressure sensor 18 associated to the brake circuit of the service brake 11, which is set up to continuously record a brake pressure $p_{Brems}$.

Figure 2:
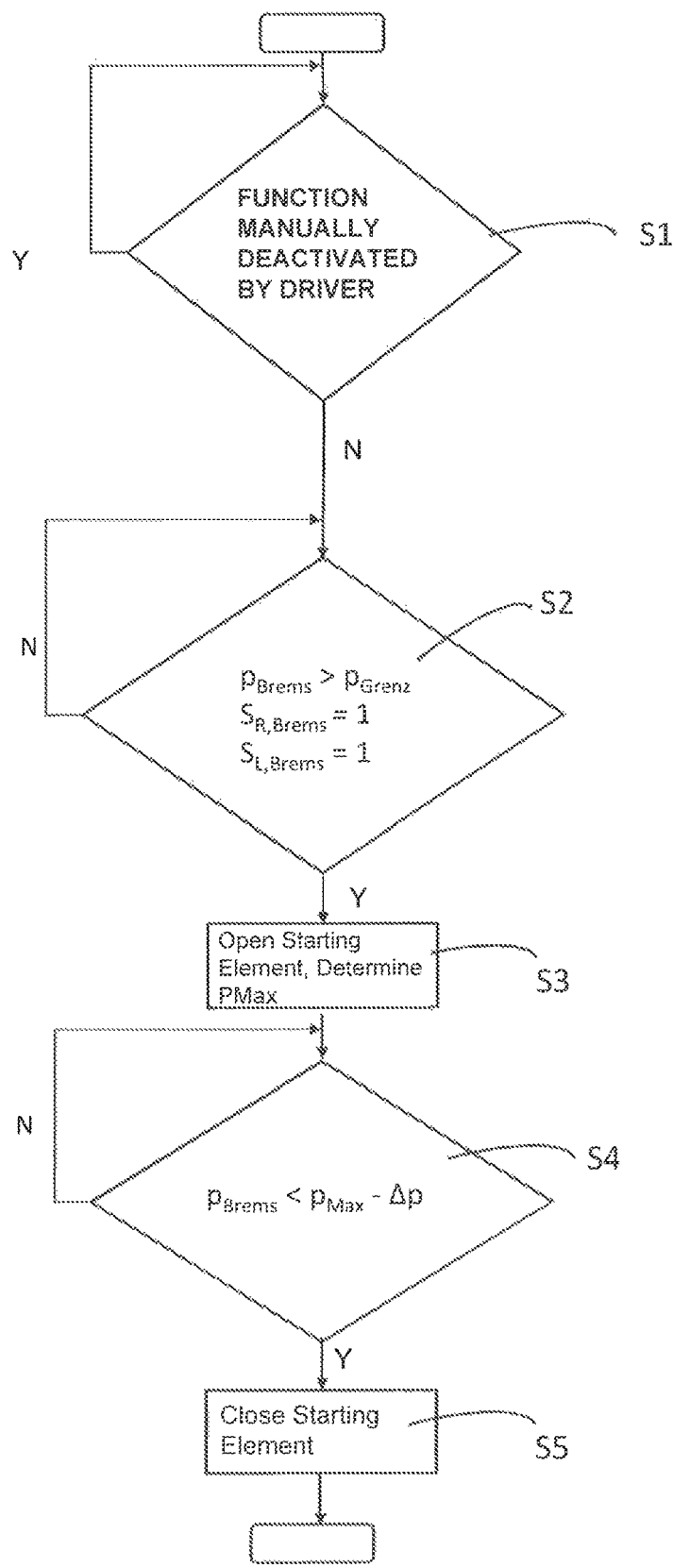
FIG. 2 shows a flow chart of a method of operating the powertrain of FIG. 1 in accordance with a preferred embodiment of the invention.

As a special feature, the control unit 13 can be used to implement the automated opening and closing of the starting element 3 as part of a function to prevent the motor vehicle from creeping forward by disconnecting the connection between the prime mover 2 and the motor vehicle transmission 4. A timely re-establishment of the connection between the prime mover 2 and the motor vehicle transmission 4 by closing the starting element 3 can be used, if the motor vehicle at the beginning of the release of the service brake 11 is in an inclined position, i.e. on a downwards or upwards slope, to prevent unwanted movement against the desired direction of travel. To detect that the service brake 11 is released and a start is desired at an early stage, the control unit 13 controls the starting element 3 in accordance with the method illustrated in the flowchart of FIG. 2:

At the beginning of the method, it is first queried in a step S1 whether the function was deactivated manually by the vehicle driver. If that is true, the initial state will be resumed and nothing will be done until the vehicle driver cancels the deactivation.

On the other hand, if the result in step S1 is true, a transition is made to a step S2, in which various conditions are queried. In step S2 a query is executed whether a brake pressure $p_{Brems}$ detected by the pressure sensor 18 is greater than a limit $p_{Grenz}$, which corresponds to the actuation of the service brake 11. In this case, the limit $p_{Grenz}$ can also have the value zero. Alternatively or additionally, the actuation states of the two wheel brakes 9 and 10 are queried in step S2, for which purpose the respective actuation state $S_{R,Brems}$ and $S_{L,Brems}$ of the respective brake light switches 19$a$, 19$b$ is checked. If the condition required in step S2 is satisfied, the program skips to step S3, whereas in the negative case, the program returns to the state of step S2.

In step S3, the starting element 3 is opened automatically and in this way the connection between the prime mover 2 and motor vehicle transmission 4 is disconnected. Furthermore, in step S3, a maximum brake pressure $p_{Max}$ is determined, which was applied to bring the motor vehicle to a standstill. The maximum brake pressure $p_{Max}$ is determined by a continuous detection of the brake pressure $p_{Brems}$, which is applied by the service brake 11 until the standstill of the motor vehicle is achieved or subsequently to maintain the standstill of the motor vehicle. After the maximum brake pressure $p_{Max}$ has been determined, step S4 is entered.

In step S4, the program checks whether if the brake pressure is below the previously determined maximum brake pressure $p_{Max}$ minus a predefinable pressure difference amount Δp. If it is exceeded, then the system proceeds to a step S5, while in the negative case, it returns to step S4. As long as the brake pressure does not fall below the maximum brake pressure $p_{Max}$ minus the pressure difference amount Δp, the brake pressure $p_{Brems}$ applied by the service brake 11 is sufficiently large to keep the motor vehicle in its current standstill position. Accordingly, it is inferred therefrom that there is no wish to drive off. If the brake pressure falls below the maximum brake pressure $p_{Max}$ minus the predetermined pressure difference amount Δp, this is interpreted as the incipient release of the service brake 11 by relieving a brake pedal to initiate the driving-off process.

In step S5, the starting element 3 is closed automatically and in this way the connection between the prime mover 2 and motor vehicle transmission 4 is re-established. Due to the early initiation of the driving-off process, subsequently an undesired movement of the motor vehicle, in particular located in an inclined position, against the desired direction of travel is prevented. Subsequent to step S5, the function is ended.

Figure 3:
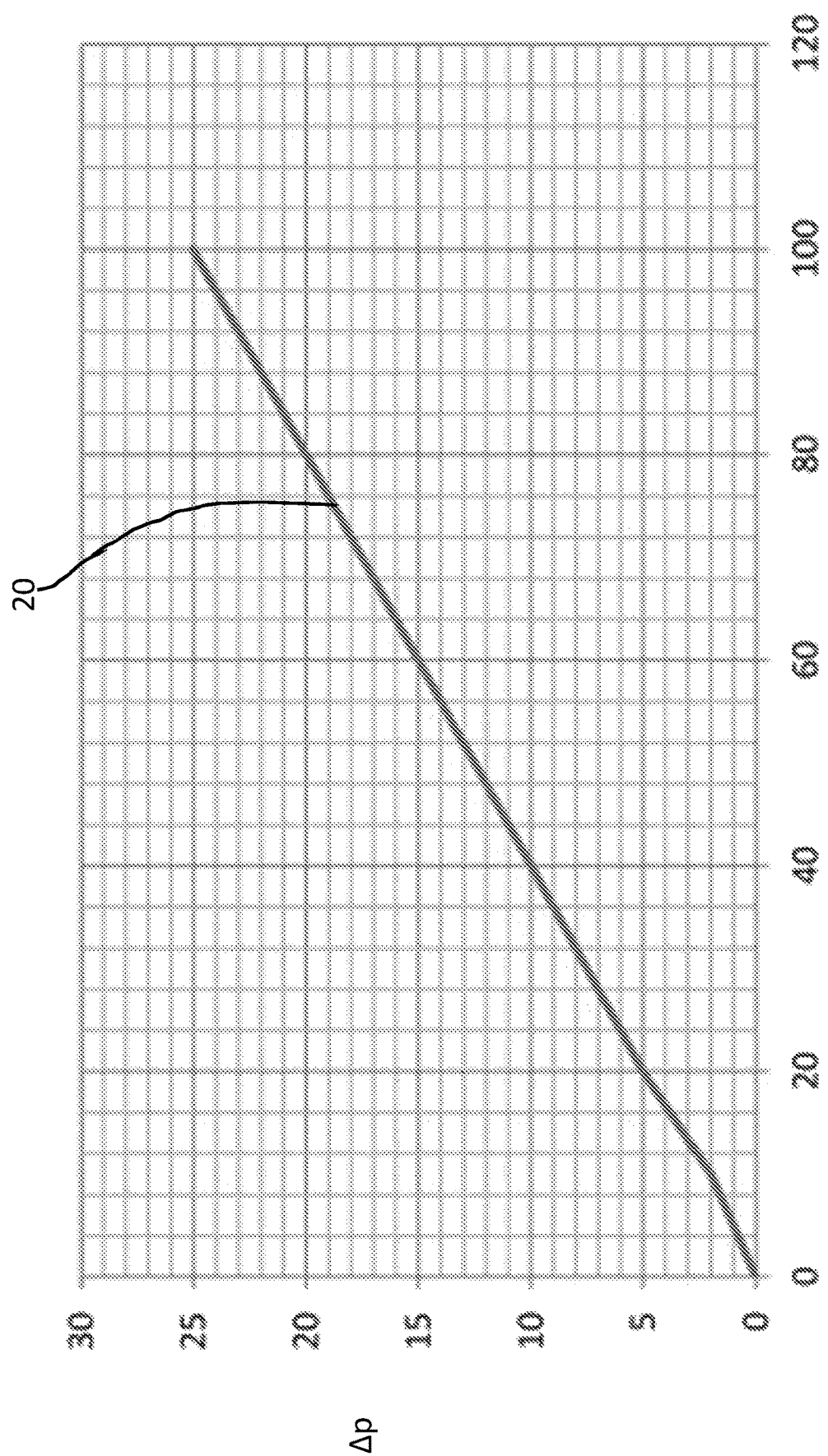
FIG. 3 shows a characteristic curve of a pressure difference.

FIG. 3 shows an exemplary characteristic curve 20 for the pressure difference amount Δp, on which the decision in step S4, if the service brake 11 is being released, is based. One or more of these characteristics 20 may be stored in the control unit 13. It is also conceivable to store a freely parameterizable table in order to enable the adaptation between the maximum brake pressure $p_{Max}$ determined based on a sensor and the pressure difference Δp.

Figure 4:
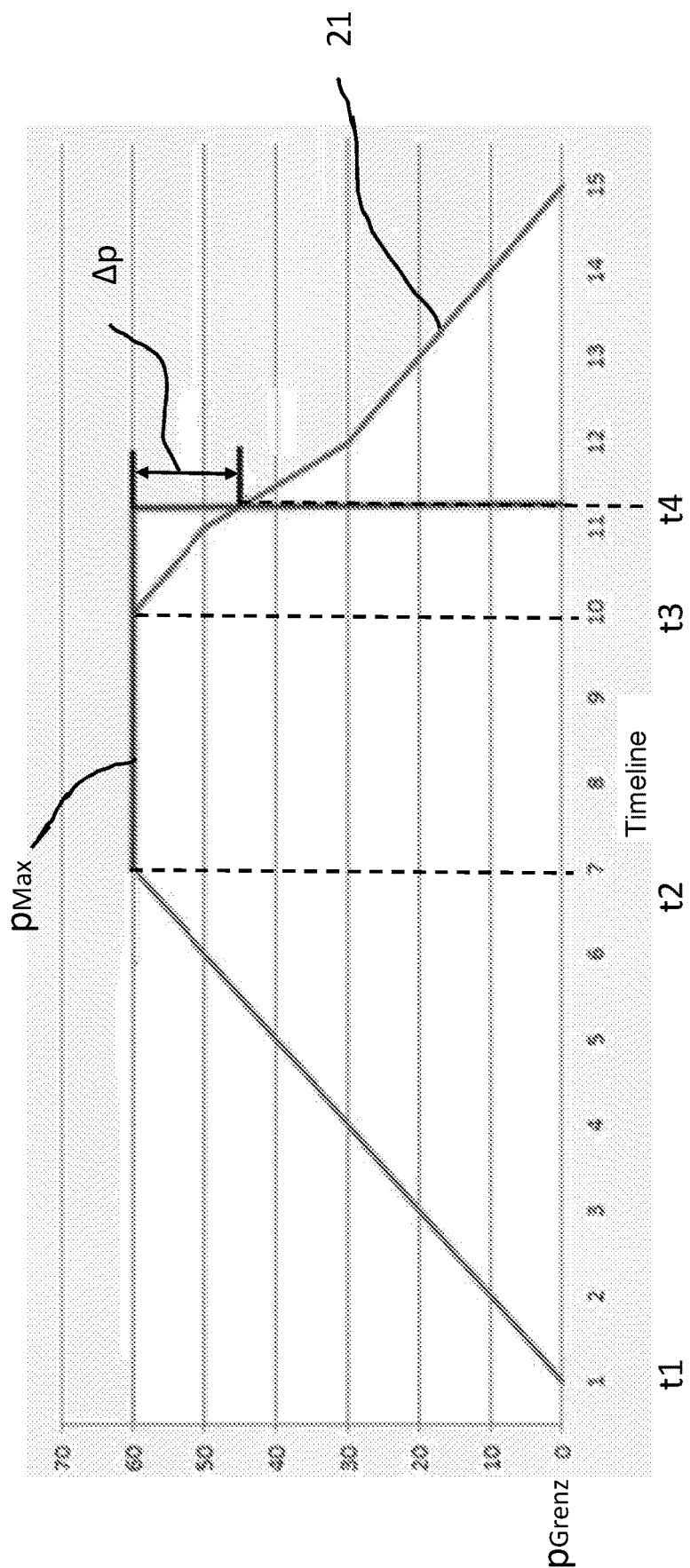
FIG. 4 shows a characteristic of a brake pressure as a function of time from the start of a braking operation to the start of a driving-off process.

FIG. 4 shows an exemplary brake pressure curve 21 of a brake pressure detected by the pressure sensor 18 as a function of the time from the start of a braking operation to the start of a driving-off operation. Upon passing the limit $p_{Grenz}$ at a time t1, which corresponds to a brake pressure of zero bar in the illustrated exemplary embodiment, thereby fulfilling the condition in step S2, the remainder of the brake pressure $p_{Brems}$ is detected during the braking operation. Upon reaching the standstill of the motor vehicle at time t2, the maximum brake pressure $p_{Max}$ is determined, which was or is applied by the service brake 11 to bring the motor vehicle to a standstill or hold it there. The release of the service brake 11 at time t3 results in a drop in the brake pressure $p_{Brems}$. If the brake pressure $p_{Brems}$ falls below the previously determined maximum brake pressure $p_{Max}$ minus the pressure difference amount Δp, the starting element 3 is automatically closed in accordance with step S5 and thus the connection between the prime mover 2 and the motor vehicle transmission 4 is re-established.

REFERENCE NUMERALS 1 drive train
2 prime mover
3 starting element
4 vehicle transmission
5 axle transmission
6 drive axle
7 drive wheel
8 drive wheel
9 wheel brake
10 wheel brake
11 service brake
12 control unit
13 control unit
14 control unit
15 control unit
16 control unit
17 data bus system
18 pressure sensor
19a, 19b brake light switch
20 pressure difference characteristic
21 braking pressure curve
$p_{Brems}$ brake pressure
$p_{Grenz}$ limit
$p_{Max}$ maximum brake pressure
Δp pressure difference
$S_{R,Brems}$ operating state brake light switch
$S_{L,Brems}$ operating state brake light switch

The invention claimed is:

1. A method of operating a drive train of a motor vehicle in an inclined position, wherein, upon actuation of a service brake monitored by at least one sensor for stopping the motor vehicle, a connection between a prime mover and at least one drive axle of the motor vehicle is automatically disconnected as part of a function, the method comprising:
determining and monitoring a maximum brake pressure applied to achieve or maintain standstill of the motor vehicle by continually measuring a service brake pressure applied by the service brake; and
automatically deactivating the function, if the service brake pressure falls below the maximum brake pressure minus a predeterminable pressure difference, and thus automatically re-establishing the connection between the prime mover and the at least one drive axle.

2. The method according to claim 1, further comprising detecting the actuation of the service brake by a sensor assigned to a brake circuit of the service brake.

3. The method according to claim 1, further comprising detecting the actuation of the service brake by monitoring an operating state of at least one brake light switch.

4. The method according to claim 1, further comprising adapting an amount of the pressure difference to the determined maximum brake pressure.

5. The method according to claim 1, further comprising performing a selection of the pressure difference based on an assignment to different maximum brake pressures stored in a table.

6. The method according to claim 1, further comprising effecting the disconnection and also a re-establishment of the connection between the prime mover and the at least one drive axle of the motor vehicle by a starting element located between the prime mover and a motor vehicle transmission.

7. A control unit for a drive train of a motor vehicle, the control unit comprising:
a first device for regulating a function for operating the drive train of the motor vehicle in an inclined position, wherein upon actuation of a service brake for stopping the motor vehicle, which is monitored by at least one sensor, the first device disconnects a connection between a prime mover and at least one drive axle of the motor vehicle as part of the function,
the first device determining and monitoring a maximum braking pressure 4 applied to achieve or maintain a standstill of the motor vehicle by continuously measuring a service brake pressure applied by the service brake, and
the first device automatically deactivates the function if the service brake pressure falls below the maximum brake pressure, minus a pre-definable pressure difference, and thus automatically re-establishes the connection between the prime mover and the at least one drive axle.

8. The control unit according to claim 7, wherein the control unit facilitating automatic disconnection of the connection between the prime mover and the at least one drive axle when the service brake is actuated, the control unit further facilitating determining and monitoring of the maximum brake pressure the control unit also facilitating automatic re-connection of the connection between the prime mover and the at least one drive axle if the service brake pressure falls below the maximum brake pressure minus the predeterminable pressure difference, and the at least one sensor for monitoring the actuation of the service brake is arranged in a brake circuit of the service brake.

9. The control unit according to claim 7, wherein a computer program product implementing a routine for deactivating the function by corresponding control commands stored in software of the computer program product.

10. The control unit according to claim 9, wherein the computer program product is stored on a computer-readable data storage medium.

11. A method of operating a drive train of a motor vehicle in an inclined position, the method comprising:
actuating a service brake for stopping the motor vehicle and monitoring a brake pressure applied by the service brake with at least one sensor;
automatically disengaging, with a control unit, a connection between a prime mover and at least one drive axle of the motor vehicle as part of a function;

continually measuring the brake pressure applied by the service brake to determine and monitor a maximum brake pressure at which standstill of the motor vehicle is achieved or maintained;

if the control unit determines that the brake pressure applied by the service brake falls below the maximum brake pressure, minus a predeterminable pressure difference, automatically deactivating the function and automatically reengaging the connection between the prime mover and the at least one drive axle.

* * * * *